United States Patent [19]

Fertig et al.

[11] Patent Number: 5,311,339
[45] Date of Patent: May 10, 1994

[54] LIQUID CRYSTAL DISPLAY HAVING A DOUBLE-REFRACTING COMPENSATION LAYER

[75] Inventors: Werner Fertig, Rossdorf; Jürgen Wahl, Bad Soden; Thomas Ott, Obertshausen, all of Fed. Rep. of Germany

[73] Assignee: Optrex Europe GmbH, Eschborn, Fed. Rep. of Germany

[21] Appl. No.: 929,696

[22] Filed: Aug. 12, 1992

[30] Foreign Application Priority Data

Oct. 4, 1991 [DE] Fed. Rep. of Germany ....... 4132902

[51] Int. Cl.$^5$ ............................................. G02F 1/133
[52] U.S. Cl. ......................................... 359/73; 359/53; 359/63
[58] Field of Search ...................... 359/53, 73, 63, 69, 359/75

[56] References Cited

U.S. PATENT DOCUMENTS

| 4,751,509 | 6/1988 | Kubota et al. | 359/95 |
| 4,822,146 | 4/1989 | Yamanobe et al. | 359/95 |
| 5,046,827 | 9/1991 | Frost et al. | 359/69 |

OTHER PUBLICATIONS

Patent abstract of Japan, vol. 13, No. 89 (P-836) Apr. 2, 1989.
Patent abstract of Japan, vol. 15, No. 5 (P-1149) Jan. 8, 1991.
Patent abstract of Japan, vol. 14, No. 185 (P-1036) Apr. 13, 1990.
Patent abstract of Japan, vol. 14, No. 136 (P-1021) Mar. 14, 1990.

*Primary Examiner*—William L. Sikes
*Assistant Examiner*—Huy Mai
*Attorney, Agent, or Firm*—Martin A. Farber

[57] ABSTRACT

A liquid-crystal display has a liquid-crystal cell (1) which is formed of two substrates (2) spaced apart from each other, and is filled with a nematic liquid-crystal substance (4). On the cell inner-space side, electrode layers (3) which can be acted on by voltage are arranged on the substrates (2). On the cell outside space side, a double-refracting compensation layer extends over the cell surface. Liquid-crystal cell (1) and compensation layer are arranged between two polarization filters (11). The compensation layer is developed over its surface with a plurality of regions adjacent to each other. The amount of the double refraction of the regions differs from each other by a small amount.

19 Claims, 1 Drawing Sheet

LIQUID CRYSTAL DISPLAY HAVING A DOUBLE-REFRACTING COMPENSATION LAYER

FIELD AND BACKGROUND OF THE INVENTION

The present invention relates to a liquid-crystal display having a liquid-crystal cell which is formed of two substrates arranged spaced apart from each other and which is filled with a liquid-crystal substance, the cell having electrode layers which can be acted on by voltage and which are arranged on the substrates within the cell; and wherein the display includes a double-refracting compensation layer arranged outside the cell extending over the surface of the cell, a polarization filter being arranged in front of and/or behind the unit consisting of liquid-crystal cell and compensation layer.

In such liquid-crystal displays having a nematic liquid-crystal substance it is known to use as compensation layer either a double-refracting foil or a non-controllable second liquid-crystal cell. In this way, interference colorings of the liquid-crystal display are to be controlled or avoided. Due to the arrangement of the electrodes, partly opposite each other, on the substrates, or as a result of manufacturing tolerances, there are different heights of the cell space in the different regions of the liquid-crystal cells and thus also different thicknesses of the liquid-crystal layer. Thus, the amounts of the double refraction differ in the different regions of the liquid-crystal display. As a result, that the transmission and the color of the display is not uniform. This problem is particularly noticeable in liquid-crystal cells in which the twist angle of the liquid-crystal substance is greater than 90° since substantially smaller tolerances in layer thickness of the liquid-crystal substance must be maintained than in the case of normally twisted nematic liquid-crystal displays.

SUMMARY OF THE INVENTION

It is an object of the invention, therefore, to provide a liquid-crystal display of the aforementioned type which has a uniform transmission and color by simple means which are easy to produce.

According to the invention, the compensation layer is developed over its entire surface with a plurality of adjacent regions producing double refraction to light rays passing therethrough, the amount of the double refraction of the region differing by a small amount from each other.

Such a development provides that the amount of the double refraction is different. Since, however, a large number of regions of different amount of double refraction are present and distributed over the entire display surface, the entire display surface appears to an observer as a homogeneous surface of uniform transmission and uniform color. This is true, in particular, when the regions of different amount of double refraction have a smaller size than can be resolved by the human eye upon a viewing from the normal position of the viewer, and thus cannot be perceived by the viewer as individual separate regions.

The liquid-crystal substance is preferably a nematic liquid-crystal substance. The regions of different amount of double refraction on the compensation layer can be arranged with simple means and in simple manner without the need of complicated manufacturing steps or action on the liquid-crystal cell.

One embodiment which is easy to produce provides that the double-refracting compensation layer be formed of a non-controllable second liquid-crystal cell (5) which consists of two substrates (6) spaced apart from each other and which is filled with a twisted nematic liquid-crystal substance (7), wherein the regions of different amounts of double refraction are formed by regions of different cell thicknesses. However, it is also possible for the regions of different amount of double refraction to be formed on the cell-space-side surfaces of the two substrates.

In order to produce the regions of different amount of double refraction, a plurality of depressions (8) can be formed on the cell space-side surface of the substrate or substrates (6), the depressions preferably having a depth which corresponds approximately to the amount of the differences in layer thickness of the liquid-crystal layer of the first liquid-crystal cell 1) over the length of the surface thereof.

The depressions (8) can be distributed either uniformly or non-uniformly.

The depressions formed on the cell-space side can be produced by corresponding structuring of the substrate surfaces themselves.

Another possibility is to apply coatings provided with the depressions, such as for instance, foils, onto the cell-space side surface of the substrate, the depressions being possibly produced, for instance, by embossing.

Another feature of the invention is that the depressions (8) are formed on the cell space-side surface of the substrate (6).

A further feature of the invention is that the cell space-side surface of the substrate is provided with a coating having the depressions.

Another embodiment which is also easy to produce has the double-refracting compensation layer arranged on the outside of the cell space of the controllable liquid-crystal cell (1).

In order to obtain a sufficiently thick layer thickness necessary for the double refraction with simple manufacture of the layer, the double-refracting compensation layer can be developed in several layers, layers of the multi-layer compensation layer being arranged in each case on both sides of the controllable liquid-crystal cell (1).

The double-refracting compensation layer can, in simple and easily produced manner, be formed of one or more foils (9).

In order to produce the regions of different amount of double refraction, the foil or foils, for example, can be subjected to a temperature treatment.

Another possibility for producing the regions of different amount of double refraction is to provide the surface of the foil (9) with a plurality o. depressions (10).

In this embodiment also, the depressions (10) can be distributed either uniformly or non-uniformly.

The depressions (10) can be produced in simple manner by embossing or by an imprinted layer.

It is particularly advantageous if the liquid-crystal substance (4, 7) of the controllable and/or non-controllable liquid-crystal cell (1, 5) is of the nematic type and has a twist angle of 90° or more in the cell since, with such a cell, measures for providing uniformity are carried out, not within the tolerance-sensitive region within the cell, but at another place free of difficulties.

BRIEF DESCRIPTION OF THE DRAWING

With the above and other objects and advantages in view, the present invention will become more clearly understood in connection with the detailed description of preferred embodiments, when considered with the accompanying drawing, of which.

DETAILED DESCRIPTION OF THE PREFERRED EMBODIMENTS

Figure 1:
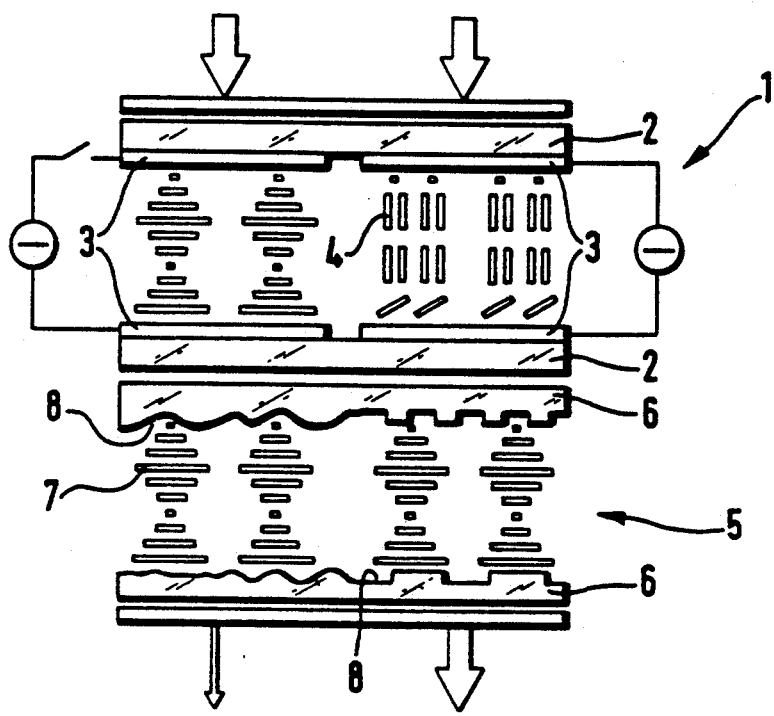
FIG. 1 is a first embodiment of a liquid-crystal display shown diagrammatically in cross section.
Figure 2:
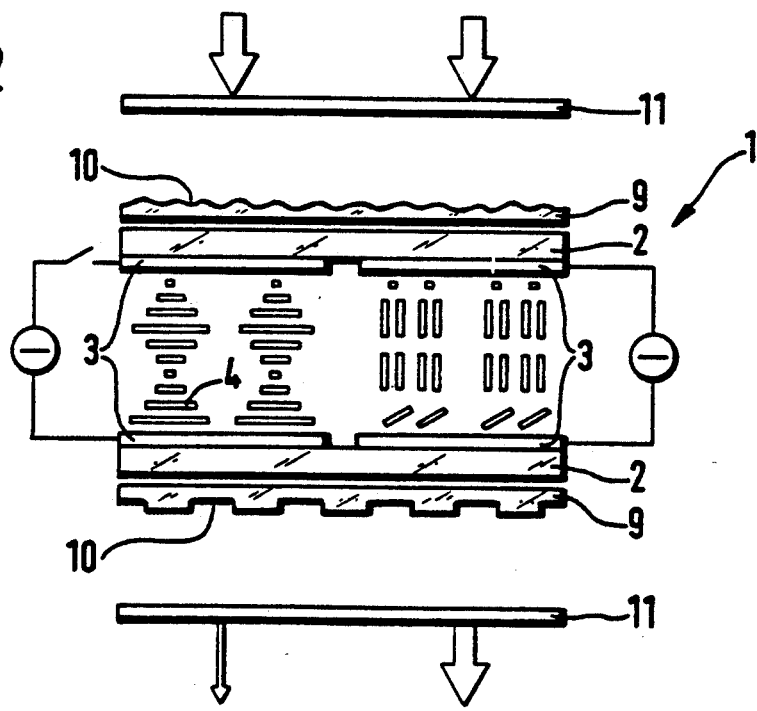
FIG. 2 is a second embodiment of a liquid-crystal display shown diagrammatically in cross section.

With reference to FIGS. 1 and 2, both embodiments have a transmissive liquid-crystal cell 1 on substrates 2 which consist of glass and are spaced from each other. Upon the substrates 2 there are arranged on the inside of the cell space electrode layers 3 which can be acted on by voltage in order to produce an image to be displayed.

In the inner space, formed between the substrates 2, of the cell which space is closed off from the outside by a packing (not shown) arranged around the edge region of the substrates 2, there is a layer of a nematic liquid-crystal substance 4, an angle of twist of more than 90° being produced by the cell.

In the embodiment of FIG. 1, a second liquid-crystal cell 5 of approximately the same length which is not controllable (fixed optical characteristics) is located in front of the controllable liquid-crystal cell 1 as seen in the direction of viewing. This second liquid-crystal cell 5 forms a double-refracting compensation layer and also has two glass substrates 6 arranged spaced from each other, which form between each other a cell space closed off from the outside also by a packing (not shown) arranged around the edge region. This cell space is also filled with a twisted nematic liquid-crystal substance 7 which is twisted by the development of the cell by a twist angle of more than 90°.

On the cell inner-space side, the two substrates 6 are provided with a plurality of depressions 7 which are formed on the right side of the cell 5 as uniformly distributed depressions with sudden transition and on the left side of the cell 5 as non-uniformly distributed depressions 8 with continuous transition.

The depressions 8 have a depth which corresponds approximately to the amount of the differences in layer thickness of the liquid-crystal substance 4 of the liquid-crystal cell 1 over its length. By virtue of the depressions 8 and the undepressed regions, a plurality of regions of different amounts of double refraction are formed in the liquid-crystal cell 5.

In the embodiment shown in FIG. 2, transparent foils 9 are arranged on each side of the liquid-crystal cell 1 covering its entire surface, the foils forming a double-refracting compensation layer. Both foils 9 are provided with depressions 10 distributed over their entire surface, the foil 9 which is furthest from the observer being developed with non-uniformly distributed depressions 10 of continuous transition and the foil 9 closer to the observer being formed with uniformly distributed depressions 10 of sudden transition.

In this embodiment also a plurality of regions of different amounts of double refraction of the foils 9 is formed by the depressions 10 and the non-depressed regions.

It is furthermore common to both embodiments that liquid-crystal cell 1 and double-refracting compensation layer (liquid-crystal cell 5 or foils 9) are arranged between two polarization filters 11.

We claim:

1. A liquid-crystal display comprising
a controllable liquid crystal cell;
wherein the controllable liquid-crystal cell comprises two substrates arranged spaced apart from each other and being filled with a liquid-crystal substance;
the cell further comprises electrode layers which can be acted on by voltage and are arranged on the substrates within the cell;
the liquid crystal display further comprises a compensation layer arranged outside the cell and extending over a surface of the cell, the compensation layer being a double-refracting compensation layer;
the display further comprises a polarization filter assembly having at least one filter, the filter assembly providing a filter in front of the liquid crystal cell and the compensation layer or behind the liquid crystal cell and the compensation layer or on opposite sides of the liquid-crystal cell and the compensation layer; and
the compensation layer comprises a plurality of adjacent regions providing double refraction to light rays passing therethrough, the amount of the double refraction of neighboring regions differing by a small amount from each other.

2. A display according to claim 1, wherein
the regions of different amount of double refraction have a smaller size than can be resolved by the human eye.

3. A display according to claim 1, wherein
said double-refracting compensation layer comprises a non-controllable second liquid-crystal cell having two substrates spaced apart from each other and being filled with a twisted nematic liquid-crystal substance, the regions of different amount of double refraction being located on a surface of said second liquid crystal cell.

4. A display according to claim 3, wherein
the liquid-crystal substance of either one or both the liquid-crystal cells is of the nematic type having a twist angle of 90° or more.

5. A display according to claim 1, wherein
the regions of differing amounts of double refraction are formed by regions of different cell thickness.

6. A display according to claim 5, wherein
the regions of different amount double refraction are formed by a plurality of depressions formed on a surface of the compensation layer facing said controllable liquid crystal cell.

7. A display according to claim 6, wherein
the depressions have a depth which corresponds approximately to the amount of the differences in layer thickness of the liquid-crystal layer of the controllable liquid-crystal cell over the length of the surface thereof.

8. A display according to claim 6, wherein
the depressions are distributed uniformly.

9. A display according to claim 6, wherein
the depressions are distributed non-uniformly.

10. A display according to claim 6, wherein
said double-refracting compensation layer comprises a non-controllable second liquid-crystal cell having two substrates spaced apart from each other and being filled with a twisted nematic liquid-crystal substance; and the depressions are formed on a substrate of the second liquid-crystal cell.

11. A display according to claim 6, wherein said double-refracting compensation layer comprises a non-controllable second liquid-crystal cell having two substrates spaced apart from each other and being filled with a twisted nematic liquid-crystal substance; and a surface of a substrate of the second liquid-crystal cell is provided with a coating having the depressions.

12. A display according to claim 1, wherein the double-refracting compensation layer comprises a plurality of layers of optically transmissive material.

13. A display according to claim 12, wherein a first and a second of the optically transmissive layers of the compensation layer are arranged on opposite sides of the controllable liquid-crystal cell.

14. A display according to claim 1, wherein the double refracting compensation layer is formed of at least one foil.

15. A display according to claim 14, wherein the regions of different amount of double refraction are produced by a temperature treatment of the foil.

16. A display according to claim 14, wherein regions of different amount of double refraction are formed by formation of a surface of the foil with a plurality of depressions.

17. A display according to claim 16, wherein
the depressions are distributed uniformly.

18. A display according to claim 16, wherein
the depressions are distributed non-uniformly.

19. A display according to claim 16, wherein
the depressions are produced by embossing.

* * * * *